US010121573B2

(12) United States Patent
Boday et al.

(10) Patent No.: US 10,121,573 B2
(45) Date of Patent: Nov. 6, 2018

(54) EPOXY-BASED RESIN SYSTEM COMPOSITION CONTAINING A LATENT FUNCTIONALITY FOR POLYMER ADHESION IMPROVEMENT TO PREVENT SULFUR RELATED CORROSION

(71) Applicant: International Business machines Corporation, Armonk, NY (US)

(72) Inventors: Dylan J. Boday, Tucson, AZ (US); Joseph Kuczynski, North Port, FL (US); Jason T. Wertz, Pleasant Valley, NY (US); Jing Zhang, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 14/989,446

(22) Filed: Jan. 6, 2016

(65) Prior Publication Data

US 2017/0194081 A1    Jul. 6, 2017

(51) Int. Cl.
*H01C 1/032* (2006.01)
*C09D 7/62* (2018.01)
(Continued)

(52) U.S. Cl.
CPC .............. *H01C 1/032* (2013.01); *C09D 5/08* (2013.01); *C09D 7/1225* (2013.01); *C09D 7/62* (2018.01);
(Continued)

(58) Field of Classification Search
None
See application file for complete search history.

(56) References Cited

U.S. PATENT DOCUMENTS 6,110,982 A     8/2000  Russick et al.
6,201,290 B1 *  3/2001  Yamada ............... H01C 1/032
                                                          257/358
(Continued)

FOREIGN PATENT DOCUMENTS

CN       101783342 B    5/2012
CN       202601344 U   12/2012
(Continued)

OTHER PUBLICATIONS

Unknown, "Celogen Chemical Foaming Agents," chempoint.com, 2015, 7 pages, printed from <http://www.chempoint.com/products/catalog/celchem-llc/celogen-chemical-foaming-agents/celogen-chemical-foaming-agents> on Nov. 30, 2015.
(Continued)

*Primary Examiner* — Randy P Gulakowski
*Assistant Examiner* — Ha S Nguyen
(74) *Attorney, Agent, or Firm* — Matthew J. Bussan (57) ABSTRACT

An epoxy-based resin system composition includes a latent functionality for polymer adhesion improvement. The composition may be used to produce an overcoat layer and/or protection layer in an anti-sulfur resistor (ASR). In some embodiments, the composition include epoxy-based resin(s), hardener(s) and, optionally, blowing agent(s) and/or filler(s). An epoxide functionality of one or more of the epoxy-based resin(s) and a reactive functionality of one or more of the hardener(s) react with each other at a first temperature. The latent functionality, which does not react at the first temperature, is contained in at least one of the epoxy-based resin(s), hardener(s) and filler(s) and reacts in response to another stimulus (e.g., UV light/initiator and/or a second temperature greater than the first temperature) to enhance chemical bonding. Optionally, voids created via etching and/or the blowing agent(s) may be used to enhance (Continued)

mechanical bonding, alone, or in combination with filler(s) exposed in the voids.

18 Claims, 6 Drawing Sheets

(51) Int. Cl.

| | | |
|---|---|---|
| *H01C 17/00* | (2006.01) | |
| *C09D 163/00* | (2006.01) | |
| *C09D 5/08* | (2006.01) | |
| *H01C 1/012* | (2006.01) | |
| *C08K 9/04* | (2006.01) | |
| *C09D 7/12* | (2006.01) | |

(52) U.S. Cl.
CPC ............ *C09D 163/00* (2013.01); *H01C 1/012* (2013.01); *H01C 17/00* (2013.01); *C08K 9/04* (2013.01)

(56) References Cited

U.S. PATENT DOCUMENTS

| | | | |
|---|---|---|---|
| 7,553,901 | B2 | 6/2009 | Horikoshi et al. |
| 8,486,533 | B2 | 7/2013 | Boday et al. |
| 8,679,932 | B1 | 3/2014 | Hill |
| 8,879,275 | B2 | 11/2014 | Boday et al. |
| 2011/0229822 | A1* | 9/2011 | Stapleton .............. H01L 21/563 430/315 |
| 2012/0328811 | A1* | 12/2012 | Patel ........................ C09D 4/00 428/36.9 |

FOREIGN PATENT DOCUMENTS

| | | |
|---|---|---|
| EP | 0305802 A2 | 3/1989 |
| EP | 0305802 A3 | 10/1989 |
| JP | 59120471 A | 7/1984 |
| JP | 3721589 B2 | 11/2005 |

OTHER PUBLICATIONS

Unknown, "Celogen(R) Foaming Agent Product Data," www.aachemical.com, 1 page, downloaded from <http://www.aachemical.com/Files/Celogen_Guide.pdf> on Nov. 30, 2015.

Kultzow et al., "Cycloaliphatic Epoxy Resins," Presented at a Meeting of the Thermoset Resin Formulators Association at the Hyatt Regency Savannah, Sep. 10-11, 2007, 18 pages.

Unknown, "CVC Thermoset Specialties—Capabilities & Product Selection Guide," CVC Thermoset Specialties, Mar. 2015, 28 pages.

Unknown, "Epoxy," Wikipedia, the free encyclopedia, Dec. 9, 2015, 11 pages, printed from <https://en.wikipedia.org/w/index.php?title=Epoxy&printable=yes> on Dec. 15, 2015.

Thomas et al., "Micro- and Nanostructured Epoxy/Rubber Blends," Wiley-VCH Verlag GmbH & Co., Weinheim, Germany, 2014, pp. 195-198.

Unknown, "Safety Data Sheet—Dow Corning(R) Z-6032 Silane," Dow Corning Corporation, May 28, 2015, 20 pages, downloaded from <http://www.dowcorning.com/DataFiles/0902770182204413.pdf> on Dec. 15, 2015.

Unknown, "SiSiB(R) PC1381 Silane," Power Chemical Corporation Ltd., 2009, 2 pages, downloaded from <http://fumed-silica.biz/library/public/SiSiB_PC1381.pdf> on Dec. 15, 2015.

Unknown, "Dow Epoxy—Calculation of Stoichiometric Ratios," The Dow Chemical Company, Sep. 3, 2015, 2 pages, printed from <http://dowac.custhelp.com/app/answers/detail/a_id/4151/~/dow-epoxy---calculation-of-stoichiometric-ratios> on Dec. 29, 2015.

Dorsey et al., "Determination of the Epoxide Equivalent Weight of Glycidyl Ethers by Proton Magnetic Resonance Spectrometry," Analytical Chemistry, vol. 49, No. 8, 1977, pp. 1144-1145 (first page only), printed from <http://pubs.acs.org/doi/abs/10.1021/ac50016a020?journalCode=ancharn> on Dec. 29, 2015.

Unknown, "Sigma-Aldrich—ProductSpecificatin—Product Name: N,N-Diglycidyl-4-glycidyloxyanaline—Product No. 412813,"Sigma-Aldrich, 1 page, downloaded from <http://www.sigmaaldrich.com/Graphics/COfAInfo/SigmaSAPQM/SPEC/412813/412813-BULK_ALDRICH_.pdf> on Dec. 29, 2015.

Unknown, "Macklin—Specification Sheet—Product No. N806520—Product Name: N,N-Diglycidyl-4-glycidyloxyanaline," Shanghai Macklin Biochemical Co., Ltd., 1 page, downloaded from <http://www.macklin.cn/products/specification/N806520/> on Dec. 29, 2015.

Unknown, "Diglycidyl 1,2-cyclohexanedicarboxylate CAS 5493-45-8", Watson Noke Scientific Ltd., 2015, 7 pages, printed from <http://watsonnoke.com/diglycidy1-12-cyclohexanedicarboxylate-cas-5493-45-8/> on Dec. 29, 2015.

\* cited by examiner

EPOXY-BASED RESIN SYSTEM COMPOSITION CONTAINING A LATENT FUNCTIONALITY FOR POLYMER ADHESION IMPROVEMENT TO PREVENT SULFUR RELATED CORROSION

BACKGROUND

The present invention relates in general to the field of corrosion protection. More particularly, the present invention relates to employing an epoxy-based resin system composition containing a latent functionality for polymer adhesion improvement in anti-sulfur resistors (ASRs) to prevent corrosion caused by environmental sulfur components.

SUMMARY

In accordance with some embodiments of the present invention, an epoxy-based resin system composition includes a latent functionality for polymer adhesion improvement. The composition may, for example, be used to produce an overcoat layer and/or a protection layer in an anti-sulfur resistor (ASR) for protecting a metal surface from sulfur related corrosion. In some embodiments, the composition includes one or more epoxy-based resins, one or more hardeners and, optionally, one or more blowing agents and/or one or more filler materials. An epoxide functionality of at least one of the one or more epoxy-based resins and a reactive functionality of at least one of the one or more hardeners react with each other at a first temperature. The latent functionality, which does not react at the first temperature, is contained in at least one of the one or more epoxy-based resins, the one or more hardeners and the one or more filler materials and reacts in response to another stimulus (e.g., UV light in conjunction with a UV initiator, such as an onium salt, and/or a second temperature greater than the first temperature) to enhance chemical bonding. Optionally, voids created via etching and/or the one or more blowing agents may be used to enhance mechanical bonding, alone, or in combination with the one or more filler materials exposed in the voids.

BRIEF DESCRIPTION OF THE SEVERAL VIEWS OF THE DRAWINGS

Embodiments of the present invention will hereinafter be described in conjunction with the appended drawings, where like designations denote like elements.

DETAILED DESCRIPTION

The electronics industry designs and tests hardware to be able to withstand typical indoor environments. Hardware failures can occur, however, in geographies with harsher indoor environments than the design set point. This has resulted in electronic component failure due to corrosion of metallurgy via a corrosive gas environment. Attempts to mitigate these electronic component failures have focused on the use of commercially available conformal coatings. These conformal coatings fall into several generic classes: silicones, epoxies, acrylates, and other organic materials. However, accelerated aging testing has revealed that silicones may actually exacerbate the problem and that corrosion is merely retarded by the other classes of conformal coatings. The porous structure of silicone conformal coatings allows the contaminants to penetrate such coatings. Furthermore, studies have revealed sulfur components (e.g., elemental sulfur, $H_2S$, and sulfur oxides) in the gaseous environment as the major culprit. Of the sulfur components, elemental sulfur appears to be the most aggressive. In the case of silicone conformal coatings, research has found that such coatings are extremely permeable to the sulfur molecule in the atmosphere and other reduced sulfur species, leading to sulfidation of silver and copper components mounted on printed circuit boards.

Corrosion caused by sulfur components in the air is especially severe when one or more of the metal conductors that electrically connect an electronic component is/are a silver-containing metal. For example, each of the gate resistors of a resistor network array typically utilizes a silver layer at each of the gate resistor's terminations. Gate resistors are also referred to as "chip resistors" or "silver chip resistors". Typically, gate resistors are coated with a glass overcoat for corrosion protection. Also for corrosion protection, it is known to encapsulate gate resistors in a resistor network array by applying a coating of a conventional room temperature-vulcanizable (RTV) silicone rubber composition over the entire printed circuit board on which the resistor network array is mounted. However, the glass overcoat and conventional RTV silicone rubber compositions fail to prevent or retard sulfur components in the air from reaching the silver layer in gate resistors. Hence, any sulfur components in the air will react with the silver layer in the gate resistor to form silver sulfide. This silver sulfide formation (often referred to as silver sulfide "whiskers") produces an electrical open at one or more of the terminations of the gate resistor and, thereby, failure of the gate resistor.

The use of silver as an electrical conductor for electrically connecting electronic components is increasing because silver has the highest electrical conductivity of all metals, even higher than copper. In addition, the concentration of sulfur components in the air is unfortunately increasing as well. Hence, the problem of corrosion caused by sulfur components in the air is expected to grow with the increased use of silver as an electrical conductor for electrically connecting electronic components and the increased concentration of sulfur components in the air.

Having found that silicone conformal coatings are problematic to the protection of silver-containing resistors due to the susceptibility of such resistors to being attacked by sulfur-bearing gases, a switch to anti-sulfur resistors (ASRs) is underway. These ASRs contain a protection layer that blocks the exposure of the silver within the resistor from contact with indoor air environments. This protection layer, which is typically an epoxy material, is applied atop a silver termination layer. In conventional ASRs, the protection layer is commonly an epoxy material that does not bond well with the epoxy overcoat layer or the platings that are applied on top of the protection layer. Consequently, the protection layer along with Ni/Sn termination layers (which are among the platings applied on top of the protection layer) can peel off the underlying silver termination layer, thus exposing the underlying silver termination layer to the indoor air environment that may contain the corrosive sulfur gases. The underlying silver termination layer is also referred to as the "upper termination". The upper termination is electrically connected to a side termination. Both the upper termination and the side termination include layer that are made from silver (Ag) or a Ag compound. Hence, a concern is that the upper termination and/or the side termination could be exposed to the corrosive environment, which possibly could lead to a cut/open.

In accordance with some embodiments of the present invention, an improved polymeric material is incorporated into the processing of the ASR that will prevent the Ni/Sn layers of the side termination and the protection layer from peeling off during use in harsh environments. By fixing this adhesion problem, the ASR will be more robust and will not be susceptible to corrosion of the underlying silver termination layer. In accordance with some embodiments of the present invention, an epoxy-based resin system composition containing a latent functionality for polymer adhesion improvement is used to make an enhanced protection layer and/or overcoat layer that prevents the peeling off of the layers (i.e., the protection layer along with the Ni/Sn layers of the side termination) and, consequently, prevents the underlying silver termination layer from being attacked by corrosive sulfur-bearing gases.

In accordance with some embodiments of the present invention, an epoxy-based resin system composition includes a latent functionality for polymer adhesion improvement. The composition may, for example, be used to produce an overcoat layer and/or a protection layer in an ASR for protecting a metal surface from sulfur related corrosion. In some embodiments, the composition includes one or more epoxy-based resins, one or more hardeners and, optionally, one or more blowing agents and/or one or more filler materials. An epoxide functionality of at least one of the one or more epoxy-based resins and a reactive functionality of at least one of the one or more hardeners react with each other at a first temperature. The latent functionality, which does not react at the first temperature, is contained in at least one of the one or more epoxy-based resins, the one or more hardeners and the one or more filler materials and reacts in response to another stimulus (e.g., UV light in conjunction with a UV initiator, such as an onium salt, and/or a second temperature greater than the first temperature) to enhance chemical bonding. Optionally, voids created via etching and/or the one or more blowing agents may be used to enhance mechanical bonding, alone, or in combination with the one or more filler materials exposed in the voids.

Epoxy-based resins, which are also referred to herein as epoxy resins, are reactive monomers, prepolymers or polymers that contain one or more (typically, two or more) epoxide groups. The epoxide group is also referred to as a glycidyl or oxirane group. Epoxy resins may be reacted (i.e., cross-linked) with a wide variety of co-reactants including, but not limited to, amines, acids, anhydrides, phenols, alcohols and thiols. Such co-reactants are often referred to as hardeners or curing agents. Typically, the cross-linking reaction between epoxy resins and the co-reactants is referred to as curing.

Suitable epoxy-based resins include, but are not limited to, bisphenol A epoxy resins, bisphenol F epoxy resins, novolac epoxy resins, aliphatic epoxy resins, cycloaliphatic epoxy resins, glycidylamine epoxy resins, polyglycol di-epoxide liquid resins, phenyl glycidyl ether, epoxy resin blends (e.g., blends of one or more cycloaliphatic epoxy resins and one or more non-cycloaliphatic epoxy resin blends), and the like.

Bisphenol A epoxy resins, which are typically produced from the reaction of bisphenol A (BPA) and epichlorohydrin, are commercially available. Bisphenyl A diglycidyl ether (BADGE), which is the simplest bisphenol A epoxy resin, is formed from reacting one mole of BPA and two moles of epichlorohydrin. Suitable bisphenol A epoxy resins include, but are not limited to, BADGE.

Bisphenol F epoxy resins, which are typically produced from the reaction of bisphenol F (BPF) and epichlorohydrin, are commercially available. Bisphenyl F diglycidyl ether (BFDGE), which is the simplest bisphenol F epoxy resin, is formed from reacting one mole of BPF and two moles of epichlorohydrin. Suitable bisphenol F epoxy resins include, but are not limited to, BFDGE.

Novolac epoxy resins, which are typically produced from the reaction of phenols with formaldehyde and subsequent glycidylation with epichlorohydrin, are commercially available. Suitable novolac epoxy resins include, but are not limited to, epoxy phenol novolacs (EPNs) and epoxy cresol novolacs (ECNs).

Aliphatic epoxy resins, which are typically produced by glycidylation of aliphatic alcohols or polyols, are commercially available. Suitable aliphatic epoxy resins include, but are not limited to, monofunctional aliphatic epoxy resins such as dodecyl and tetradecyl glycidyl ethers (CAS Number 68609-97-2), difunctional aliphatic epoxy resins such as butanediol diglycidyl ether (CAS Number 2425-79-8), and higher functional aliphatic epoxy resins such as trimethylolpropane triglycidyl ether (CAS Number 3454-29-3).

Cycloaliphatic epoxy resins, which are related to aliphatic epoxy resins but contain one or more cycloaliphatic rings in the molecule, are commercially available. The reactivity of cycloaliphatic epoxy resins is rather low compared to other classes of epoxy resin. Hence, one or more cycloaliphatic epoxy resins may serve as the latent functionality in accordance with some embodiments of the present invention. That is, the latent functionality may be contained in at least one of the one or more epoxy-based resins (i.e., also referred to herein as a "latent epoxy") of the epoxy-resin based system composition. An illustrative example of a suitable cycloaliphatic epoxy resin is diglycidyl 1,2-cyclohexanedicarboxylate (CAS Number 5493-45-8), which is a diglycidyl ester of hexahydrophthalic acid. Another illustrative example of a suitable cycloaliphatic epoxy resin is 3,4-epoxycyclohexyl-methyl-3,4-epoxycyclohexanecarboxylate (CAS Number 2386-87-0).

Of the two exemplary cycloaliphatic epoxy resins referred to above, 3,4-epoxycyclohexylmethyl-3,4-epoxycyclo-hexanecarboxylate is significantly more reactive than diglycidyl 1,2-cyclohexanedicarboxylate because the ring strain in the former that is absent from the latter. Accordingly, diglycidyl 1,2-cyclohexanedicarboxylate is referred to herein as a "latent epoxy" relative to 3,4-epoxycyclohexyl-methyl-3,4-epoxycyclo-hexanecarboxylate.

Either or both of these two exemplary cycloaliphatic epoxy resins may be utilized along with one or more suitable anhydride hardeners, for example, to provide a cycloaliphatic epoxy resin/anhydride system. Suitable anhydride hardeners include, but are not limited to, hexahydrophthalic anhydride (HHPA) (CAS Number 85-42-7) and N,N-dimethylbenzylamine (BMDA) (CAS Number 103-83-3).

Glycidylamine epoxy resins, which are typically produced from the reaction of aromatic amines and epichlorohydrin, are commercially available. Typically, glycidylamine epoxy resins are highly reactive. Suitable glycidylamine epoxy resins include, but are not limited to, N,N-diglycidyl-4-glycidyloxyaniline (CAS Number 5026-74-4) and 4,4'-methylenebis-(N,N-diglycidylaniline) (CAS Number 28768-32-3).

Depending on the application, flexible resins such as polyglycol di-epoxide liquid resins may be preferred to impart flexibility. Polyglycol di-epoxide liquid resins, which are produced from the reaction of polypropylene glycol and epichlorohydrin, are commercially available.

Phenyl glycidyl ether (CAS Number 122-60-1) is another suitable commercially available epoxy-based resin.

As mentioned above, epoxy resin blends of one or more cycloaliphatic epoxy resins and one or more non-cycloaliphatic epoxy resins may be utilized in accordance with some embodiments of the present invention. In an illustrative example, of suitable epoxy resin blends may be provided by utilizing a blend of diglycidyl 1,2-cyclohexanedicarboxylate (CAS Number 5493-45-8) [i.e., one of the two exemplary cycloaliphatic epoxy resins] and N,N-diglycidyl-4-glycidyloxyaniline (CAS Number 5026-74-4) [a glycidylamine epoxy resin] (along with one or more suitable curing agents, for example, to provide a cycloaliphatic epoxy resin/non-cycloaliphatic epoxy resin/anhydride system). Of these two epoxy-based resins, N,N-diglycidyl-4-glycidyloxyaniline is significantly more reactive than diglycidyl 1,2-cyclohexanedicarboxylate because the former is a highly reactive glycidylamine epoxy resin while the latter is a cycloaliphatic epoxy resin. Accordingly, diglycidyl 1,2-cyclohexanedicarboxylate is referred to herein as a "latent epoxy" relative to N,N-diglycidyl-4-glycidyloxyaniline. In such a cycloaliphatic epoxy resin/non-cycloaliphatic epoxy resin/anhydride system, suitable curing agents include, but are not limited to, methyltetrahydrophthalic anhydride (MTHPA) (CAS Number 11070-44-3 or 26590-20-5) and methyl-5-norbornene-2,3-dicarboxylic anhydride (CAS Number 25134-21-8) (also referred to as Nadic® Methyl Anhydride (NMA)).

The addition of a hardening agent to the epoxy-based resin causes the liquid resin to cure or harden to a rigid (typically) cross-linked polymer. When the epoxy-based resin is intimately mixed with a stoichiometric amount of a hardening agent containing labile hydrogen atoms, the epoxy ring opens and reacts with the hardening agent. Common classes of hardeners for epoxy-based resins include amines, acids, acid anhydrides, phenols, alcohols and thiols. Relative reactivity (lowest to the highest) is typically in the order: phenols<anhydrides<aromatic amines<cycloaliphatic amines<aliphatic amines<thiols. Hence, one or more classes of hardeners may serve as the latent functionality in accordance with some embodiments of the present invention. That is, the latent functionality may be contained in at least one of the one or more hardeners (i.e., also referred to herein as a "latent hardener") of the epoxy-resin based system composition. Accordingly, an aromatic amine may be referred to as a "latent amine" relative to a cycloaliphatic amine or an aliphatic amine. Moreover, hardeners with only secondary amines are generally relatively less reactive than hardeners with primary amines. In fact, the reactivity of the primary amine is approximately double that of the secondary amine.

The relative rate of reaction "$k_{rel}$" of each of various amines with phenyl glycidyl ether at 50° C., as disclosed in Table 10.1 of Thomas et al., "Micro- and Nanostructured Epoxy/Rubber Blends," Wiley-VCH Verlag GmbH & Co., Weinheim, Germany, 2014, pp. 197, is illustrative. For example, the rates of reaction of exemplary amines with phenyl glycidyl ether (an exemplary epoxy-based resin) at 50° C. are as follows:

Amino-ethylpiperazine ($k_{rel}$=65.3)
N-Methylcyclohexylamine ($k_{rel}$=14.9)
Aniline ($k_{rel}$=1.0)
N-Ethylpiperazine ($k_{rel}$=42.0)
Benzylamine ($k_{rel}$=11.3)
N,N,N'-Trimethylethylene-diamine ($k_{rel}$=29.7)
Neopenylamine ($k_{rel}$=13.6)
N,N'-Dimethylethylenediamine ($k_{rel}$=47.3)
Amino-ethylpiperidine ($k_{rel}$=15.4)
Cyclohexylamine ($k_{rel}$=10.9)
N-Methylaniline ($k_{rel}$=0.45)
Morpholine ($k_{rel}$=18.5)
N,N'-Diethyl-1,2-ethanediamine ($k_{rel}$=20.3)
N,N,N,N'-Tetramethyl-diethylenetriamine ($k_{rel}$=11.7)
Methoxy-ethylamine ($k_{rel}$=11.0)

Most cured epoxy foams (also referred to herein as "blown epoxy") are produced using one of three types of hardening agents, which are amines, polyphenols, and anhydrides. Aside from one or more epoxy-based resins and one or more hardeners, other constituents used to make epoxy foams typically include a blowing agent, a surfactant, and one or more filler materials or nucleating agents (hereinafter referred to as one or more "filler materials"). Epoxy foams comprising a plurality of resins, a plurality of curing agents, at least one blowing agent, at least one surfactant and optionally at least one filler, as well as processes for making the same, are disclosed in U.S. Pat. No. 6,110,982, which is hereby incorporated herein by reference in its entirety.

Blowing agents, which are also referred to as "foaming agents", typically are chemical blowing agents that release either nitrogen gas or carbon dioxide gas through decomposition when heated. Suitable chemical blowing agents include, but are not limited to, ammonium carbonate, sodium bicarbonate, and sulfonyl hydrazide. Other suitable chemical blowing agents include, but are not limited to, azodicarbonamide (ADC) foaming agents and p-p'-oxybis (benzenesulfonyl-hydrazide) (OBSH) foaming agents. Suitable ADC foaming agents include, but are not limited to, CELOGEN AZ-120 (average particle diameter 3-5.5 μm), CELOGEN AZ-130 (average particle diameter 5-6 μm), CELOGEN AZ-150 (average particle diameter 8-10 μm), and CELOGEN AZ-1901 (average particle diameter 14.1-16 μm) available from CelChem LLC, Baton Rouge, La. Suitable OBSH foaming agents include, but are not limited to, CELOGEN OT (Oil Treated) (average particle diameter 5-15 μm) available from CelChem LLC, Baton Rouge, La. A chemical blowing agent may be selected based on, at least in part, its decomposition temperature (i.e., the temperature at which the blowing agent releases gas). For example, CELOGEN OT, which has a decomposition temperature of approximately 153-167° C., is a relatively low temperature blowing agent as compared to the CELOGEN AZ products, which have a decomposition temperature of approximately 190-220° C. The blowing agent may be mixed into the epoxy-based resin using a Banbury mixer.

Alternatively, the blowing agent may be a physical blowing agent. Suitable physical blowing agents include, but are not limited to, liquid solvents such as pentane, toluene, fluorocarbons (FCs), chlorofluorocarbons (CFCs), and hydrochlorofluorocarbons (HCFCs).

Surfactants are used in epoxy-based resin system compositions to promote foaming and stabilization of the subsequent void structure. A surfactant generally serves to decrease the surface tension of the pre-cure composition and thereby promote increased expansion, smaller voids, and more uniform void size and texture of the resultant blown epoxy. The surfactants used in polyurethane foam systems, such as silicone-based surfactants, may generally be used in epoxy-based resin system compositions. The void structure can be greatly affected by the surfactant, which in turn influences the properties of the resultant blown epoxy.

Filler materials may be added to the epoxy-based resin system composition for reasons including improving mechanical bonding, as well as lowering cost, adding color, reducing exotherms, and controlling shrinkage rates. Suitable filler materials include, but are not limited to, silica fibers, silica particles, carbon black, $TiO_2$, ZnO, and combinations thereof. These filler materials may be neat or surface modified to contain the latent functionality. For example, modified silica fibers may be either pre-blend modified (i.e., silica fibers are surface modified to contain the latent functionality before the silica fibers are blended into the epoxy-based resin system composition) or post-exposure modified (i.e., silica fibers are surface modified to contain the latent functionality after being exposed in the voids on the surface of the etched/blown epoxy).

Fillers in the form of fine particles (e.g., carbon black and fumed silica) may also serve as nucleating agents. Small particles provide sites for heterogeneous nucleation which allows for initiation and subsequent growth of foam voids. In heterogeneous nucleation, gas molecules driven by supersaturation preferentially form nucleation sites on the solid/fluid interfaces of the nucleation agent. The ultimate void size is determined by other factors including the exotherm, the rate of cure, the amount of blowing agent, and interactions between the epoxy-based resin and the surfactant.

While embodiments of the present invention are described herein in the context of an epoxy-based resin system composition containing a latent functionality for polymer adhesion improvement, the present invention is not so limited. Other polymeric materials containing a latent functionality for polymer adhesion improvement may be used in lieu of, or in addition to, an epoxy-based resin system composition. For example, silicones, acrylates, and other organic materials containing a latent functionality for polymer adhesion improvement may be used in lieu of, or in addition to, an epoxy-based resin system composition.

In accordance with some embodiments of the present invention, an improved polymeric material is used to produce an overcoat layer and/or a protection layer in an anti-sulfur resistor (ASR). This results in an enhanced ASR that is peel-resistant. In general, standard processes used to create conventional ASRs may be used to form the peel-resistant ASR.

One skilled in the art will appreciate, however, that applications for the improved polymeric material are not limited to the production of the overcoat layer and/or the protection layer in ASRs. The improved polymeric material may be used to produce other polymeric layers associated with ASRs (e.g., a polymer conformal coating that overlies a network resistor array), as well as other electronic components that have metal conductors that are susceptible to being attacked by corrosive sulfur-bearing gases.

In conventional ASRs, as noted above, the protection layer is commonly an epoxy material that does not bond well with the epoxy overcoat layer or the platings (i.e., the Ag plating layer of the side termination and the Ni/Sn plating layers of the side termination) that are applied on top of the protection layer. This situation is corrected, in accordance with some of the embodiments of the present invention, through the use of a resin-based epoxy system composition that includes a latent functionality for polymer adhesion improvement and through the use of strategies such as etching for mechanical bonding improvement.

In accordance with some embodiments of the present invention, an overcoat layer is applied to at least a portion of the resistor element and a first portion of the Ag layer of the upper termination. After the overcoat layer is applied and cured, at least a portion of the cured overcoat layer may be modified via an etching process. The cured overcoat layer may be etched in its entirety or locally in one or more critical areas (e.g., regions where the protection layer will be subsequently applied). The etching process may be mechanical and/or chemical. For example, the cured overcoat layer may be etched using a mechanical etching process such as bead blasting or polishing. Alternatively, the cured overcoat layer may be etched using a chemical etching process such as acid etching, alkaline etching, permanganate etching, or gas plasma etching. The etching process creates a rough surface (i.e., voids) on the surface of the cured overcoat layer. Additionally, in accordance with some embodiments of the present invention, the overcoat layer is a functionalized epoxy layer that contains a latent functionality (i.e., latent amine groups and/or latent epoxy groups). After etching, the epoxy protection layer is then applied and cured. When the protection layer is applied, it is able to flow into the voids of the roughened surface of the epoxy overcoat layer to form a mechanical interlock (i.e., a mechanical bond between the protection layer and the overcoat layer). In addition, because the overcoat layer has functional groups (i.e., the latent functionality), chemical bonding between protection layer and the latent amine groups and/or the latent epoxy groups of the overcoat layer will occur. This chemical and mechanical bond ensures that the protection layer will not be able to peel.

Further, after the protection layer is applied and cured, the protection layer can then be etched to allow mechanical interlocks to be formed when the Ag or Ag compound layer, the Ni or Ni compound layer, and the Sn or Sn compound layer of the side termination are applied to the protection layer. That is, mechanical interlocks may be formed between the protection layer and the Ag layer of the side termination, between protection layer and the Ni layer of the side termination, and between the protection layer and the Sn layer of the side termination.

In accordance with some embodiments, the overcoat layer contains a blowing agent that allows the overcoat layer to form voids (similar to the pores in foams) which then allows the layers to form mechanical interlocks when the protection layer and the platings are applied to the overcoat layer. For example, a mechanical bond may be formed between the overcoat layer and the protection layer, between the overcoat layer and the Ni layer of the side termination, and between the overcoat layer and the Sn layer of the side termination.

Further, the overcoat layer and/or the protection layer may contain one or more modified filler materials (e.g. silica fibers or silica particles surface modified to contain latent epoxy or amine functionalities), and when etched or otherwise exposed (e.g., via a blowing agent), the modified filler materials will allow for chemical bonding between the two epoxy layers (i.e., between the overcoat layer and the protection layer). The modified filler material when exposed additionally can act as a "hook" type structure that will allow the protection layer to have better mechanical bonding to the overcoat layer. The modified filler material may be pre-blend modified (i.e., the filler material is surface modified to contain the latent functionality before the filler material is blended into the epoxy-based resin system composition) or post-exposure modified (i.e., the filler material is surface modified to contain the latent functionality after being exposed in the void on the surface of the cured overcoat layer and/or protection layer).

Alternatively, the overcoat layer and the protection layer could be filler-free and only have the latent functionality for chemical bonding integrated into the epoxy networks of the overcoat layer and the protection layer. Additionally, as described above, mechanical bonding between such filler-free overcoat and protection layers may be enhanced via etching or through the use of a blowing agent.

The latent functionality can be reacted either by heat or UV curing methods that are not used to initially cure the epoxy resin. For example, the epoxy resin (e.g., phenyl glycidyl ether) used to produce the overcoat layer may be blended with a hardener containing a relatively more reactive amine such as amino-ethylpiperazine ($k_{rel}$=65.3) that requires 50° C. curing temperatures (i.e., the hardener and the epoxy resin react with each other in the initial cure at 50° C.) and another hardener (and/or one or more modified filler materials) containing a latent amine functionality that is relatively less reactive (e.g., a secondary amine) such as N,N'-diethyl-1,2-ethanediamine ($k_{rel}$=20.3) and requires higher heat (or UV light in conjunction with a UV initiator, such as an onium salt) to cure. In this example, $k_{rel}$ is the relative rate of reaction "$k_{rel}$" of a given amine with phenyl glycidyl ether at 50° C. Similarly, the epoxy resin used to produce the protection layer may also be blended with a hardener containing the latent amine functionality. This ensures that the functionalities that have been added respond only when desired (e.g., when the protection layer is cured). Unless there is a UV initiator, UV light will not initiate curing of the latent hardener. Onium salt is the most common UV initiator. In this example, the formulation used to produce the overcoat layer and/or protection layer would need to contain a thermally stable onium salt or other UV initiator. Fortunately, the most common onium salts are very thermally stable. For example, one or more of the hardeners may be a UV initiator, such as an onium salt.

Alternatively, the same hardener may contain both the relatively more reactive amine and the relatively less reactive amine (i.e., the latent amine functionality). For example, such a hardener may contain both a primary amine (which is a relatively more reactive amine) and a secondary amine (which is a relatively less reactive amine).

Also, as mentioned above, in some embodiments of the present invention, one or more modified filler materials may contain the latent amine functionality. For example, the epoxy resin (e.g., phenyl glycidyl ether) used to produce the overcoat layer may be blended with a hardener containing a relatively more reactive amine such as amino-ethylpiperazine ($k_{rel}$=65.3) that requires 50° C. curing temperatures (i.e., the hardener and the epoxy resin react with each other in the initial cure at 50° C.) and one or more modified filler materials containing a latent amine functionality that is relatively less reactive (e.g., a secondary amine) and requires higher heat (or UV light in conjunction with a UV initiator) to cure. Silica fibers or particles may be modified via silane surface modification using Dow Corning® Z-6032 Silane, for example, which contains secondary amines as the latent functionality. Alternatively, as mentioned above, the latent functionality could be added in a subsequent step to the surface of the etched/blown epoxy surface. For example, silica fibers or particles exposed on the etched/blown epoxy surface may be modified after they are exposed on the etched/blown epoxy surface. Here too, the silica fibers or particles may be modified via silane surface modification using Dow Corning® Z-6032 Silane, for example, which contains a secondary amine as the latent functionality.

Figure 1:
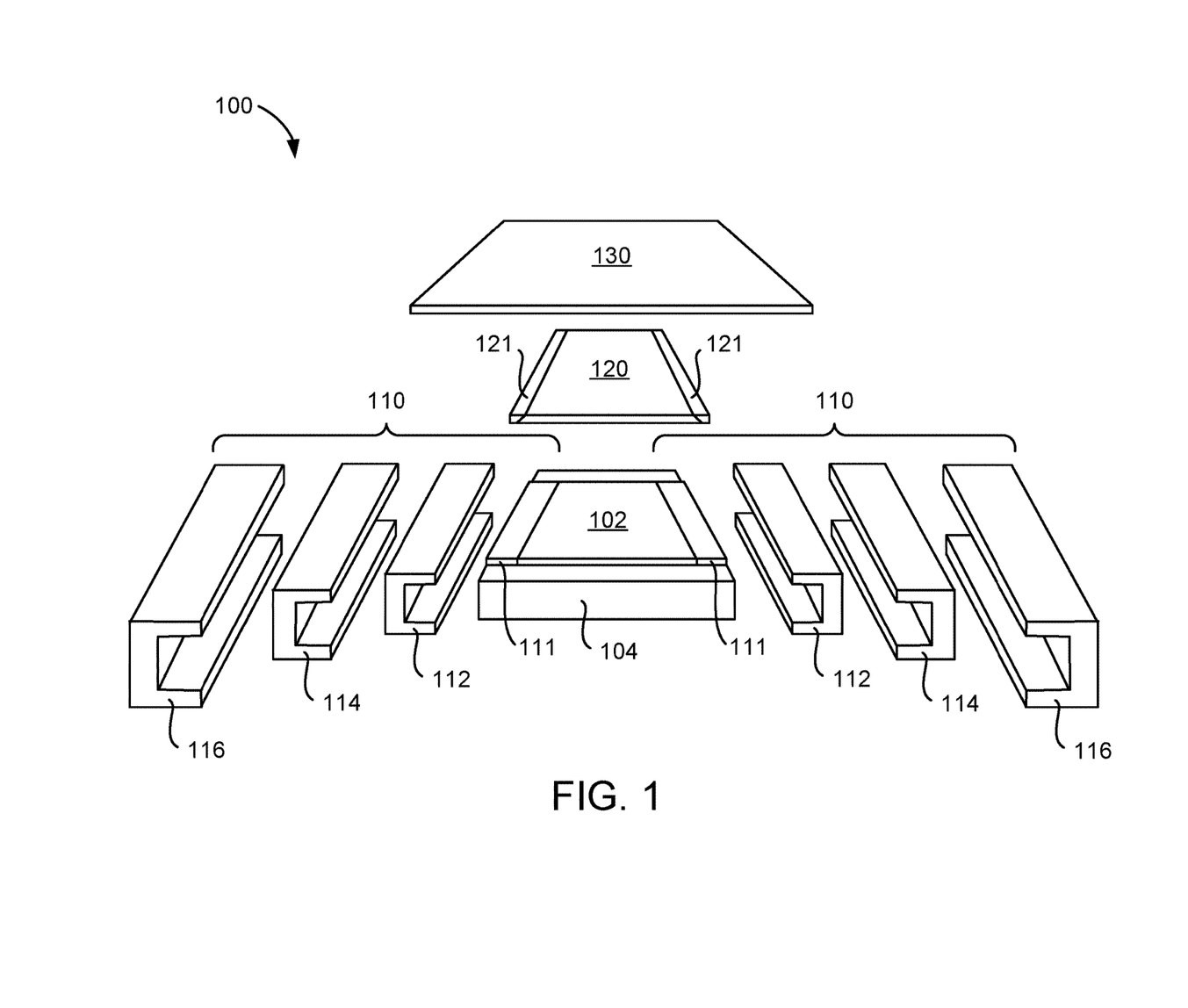
FIG. 1 is an exploded view of an anti-sulfur resistor (ASR) that utilizes an epoxy-based resin system composition containing a latent functionality for polymer adhesion improvement to better protect metal conductors from corrosion, in accordance with some embodiments of the present invention.
Figure 2:
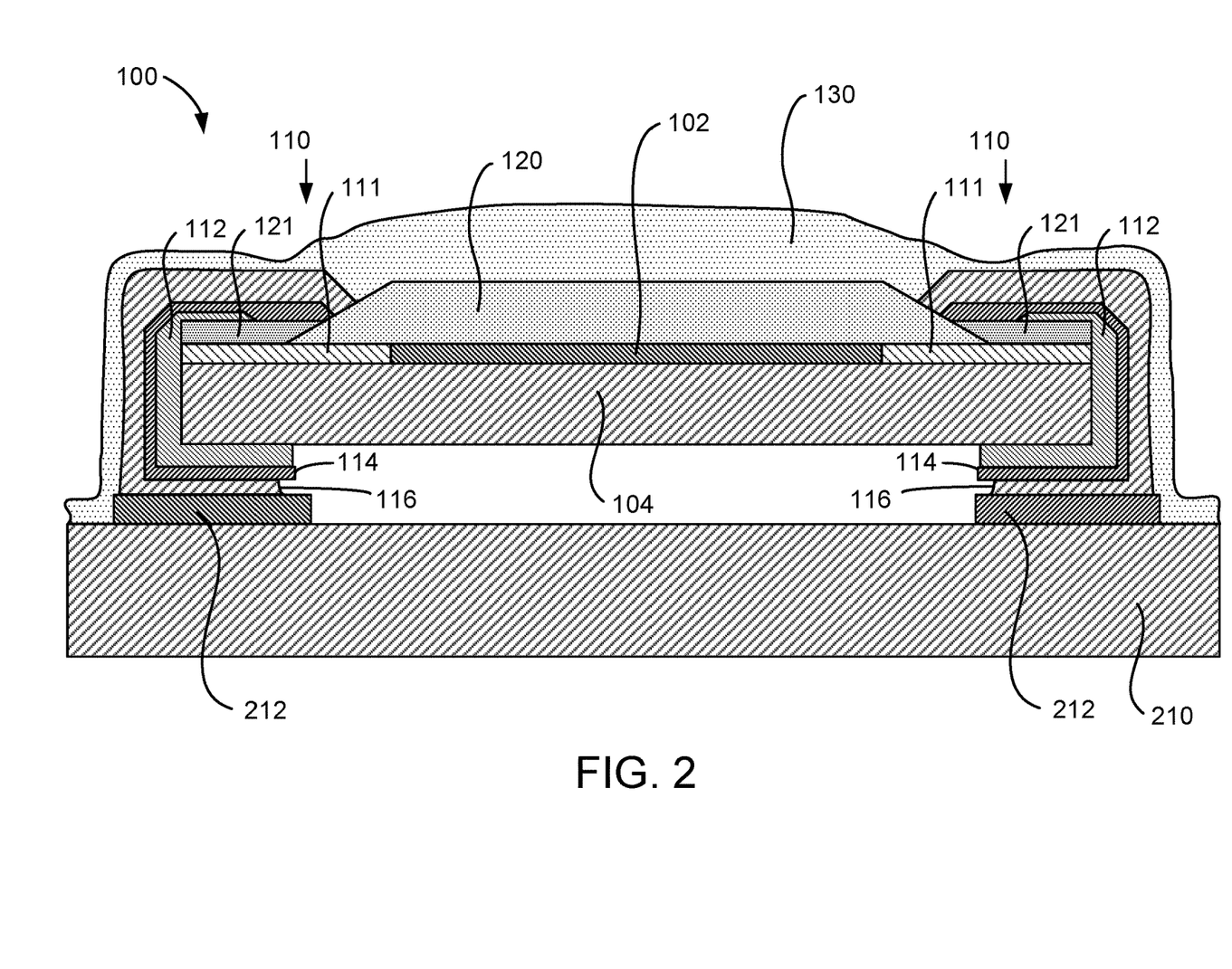
FIG. 2 is a sectional view of the anti-sulfur resistor (ASR) shown in FIG. 1, but which is shown mounted on a printed circuit board.
Figure 3:
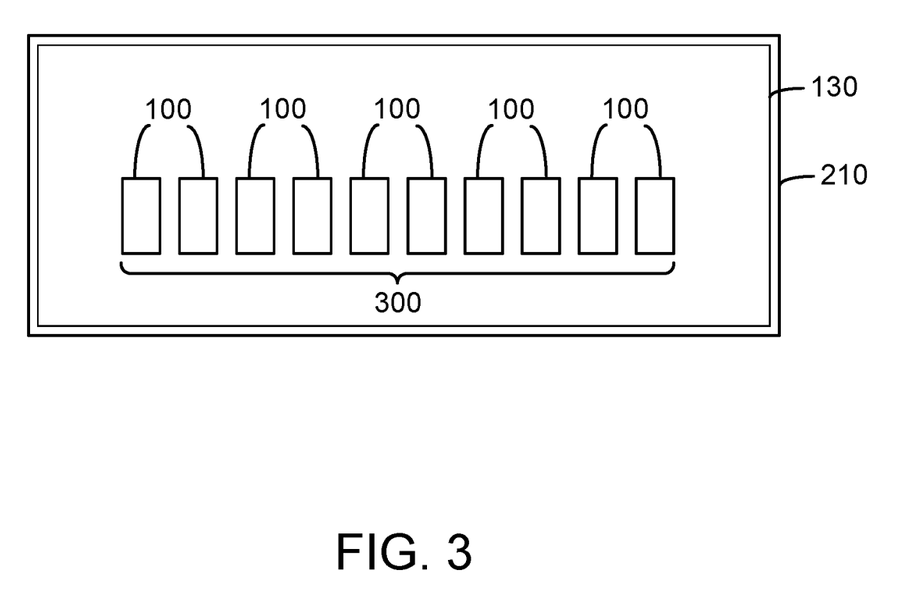
FIG. 3 is a top view of a resistor network array depicting a plurality of anti-sulfur resistors (ASRs) shown in FIGS. 1 and 2.

Some embodiments of the present invention are described herein in the context of protecting metal conductors of an exemplary anti-sulfur resistor (ASR) in a resistor network array from corrosion caused by sulfur components in the air. An exemplary ASR and resistor network array are depicted in FIGS. 1-3. One skilled in the art will appreciate, however, that the present invention can also apply to protecting metal conductors of ASRs and resistor network arrays having configurations differing from the ASR and resistor network array shown in FIGS. 1-3 and to protecting metal conductors of gate resistors and other electronic components, and, more generally, to protecting a metal surface of any product.

Referring now to FIG. 1, there is depicted, in an exploded view, an anti-sulfur (ASR) 100 of a resistor network array 300 (shown in FIG. 3) that utilizes an epoxy-based resin system composition containing a latent functionality for polymer adhesion improvement to protect metal conductors from corrosion, in accordance with some embodiments of the present invention. FIG. 2 is a sectional view of the anti-sulfur resistor (ASR) 100 shown in FIG. 1, but which is shown mounted on a printed circuit board 210. FIG. 3 is a top view of a resistor network array 300 that includes a plurality of the anti-sulfur resistors (ASRs) shown in FIGS. 1 and 2.

As shown in FIGS. 1 and 2, a resistor element 102 is mounted to a substrate 104, such as a ceramic substrate. The anti-sulfur resistor 100 includes two termination structures 110, each typically comprising a Ag (silver) (or Ag compound) layer 111 of an upper termination, a Ag (silver) (or Ag compound) layer 112 of a side termination, a Ni (nickel) (or Ni compound) layer 114 of the side termination, and a Sn (tin) (or Sn compound) layer 116 of the side termination. Each of the termination structures 110 of the anti-sulfur resistor 100 is also referred to herein as a "metal conductor".

For corrosion protection, in accordance with some embodiments of the present invention, each ASR 110 in a resistor network array is coated with a polymer overcoat layer 120 and a polymer protection layer 121. The overcoat layer 120 and/or the protection layer 121, in accordance with some embodiments of the present invention, is/are produced using an epoxy-based resin system composition includes a latent functionality for polymer adhesion improvement to protect the silver components in the termination structure 110 from sulfur related corrosion. In some embodiments, the epoxy-based resin system composition includes one or more epoxy-based resins, one or more hardeners and, optionally, one or more blowing agents and/or one or more filler materials. An epoxide functionality of at least one of the one or more epoxy-based resins and a reactive functionality of at least one of the one or more hardeners react with each other at a first temperature. The latent functionality, which does not react at the first temperature, is contained in at least one of the one or more epoxy-based resins, the one or more hardeners and the one or more filler materials and reacts in response to another stimulus (e.g., UV light in conjunction with a UV initiator and/or a second temperature greater than the first temperature) to enhance chemical bonding. Optionally, voids created via etching and/or the one or more blowing agents may be used to enhance mechanical bonding, alone, or in combination with the one or more filler materials exposed in the voids.

The ASRs in a resistor network array are typically soldered to a printed circuit board by SMT (surface mounting technology) processes. As best seen in FIG. 2, the termination structures 110 of each ASR 100 in the resistor network array 300 (shown in FIG. 3) are soldered to corresponding terminals or pads 212 on the printed circuit board 210. For example, the Sn layer 116 (solder) of the termination structures 110 of each ASR 100 may be reflowed to join (i.e., electrically and mechanically) the termination structures 110 on the base of the ASR 100 with the corresponding terminals or pads 212 on the printed circuit board 210.

Optionally, as shown in FIG. 2, after each ASR 100 is mounted on the printed circuit board 210, a conformal coating 130 may be applied. The conformal coating 130 may be produced using a conventional composition (e.g., a conventional RTV silicone rubber composition) or, alternatively, an epoxy-based resin system composition that includes a latent functionality for polymer adhesion improvement in accordance with some embodiments of the present invention.

Conformal coatings typically fall into several generic classes: silicones, epoxies, acrylates, and other organic materials. For example, the conformal coating 130, if present, may be produced using a conventional RTV silicone rubber composition, such as Dow Corning® 1-2620 RTV Coating or Dow Corning® 1-2620 Low VOC RTV Coating. Typically, it is desirable for the conformal coating 130 to be non-water absorbing to avoid shorting from occurring through pathways created by water. It may also be desirable for the conformal coating 130 to be halogen-free (i.e., RoHS compliant).

As best seen in FIG. 3, in accordance with some embodiments of the present invention, the conformal coating 130 covers essentially the entire printed circuit board 210, encapsulating each of the ASRs 100 of the resistor network array 300 (as well as any other discrete electronic component(s) mounted on the board 210). Alternatively, the conformal coating 130 may cover only one or more specific areas of the printed circuit board 210.

Advantageously, existing deposition processes may be used for applying the overcoat layer 120 and/or protection layer 121. In general, standard processes used to create conventional ASRs may be used to form a peel-resistant ASR in accordance with some embodiments of the present invention.

Figure 4:
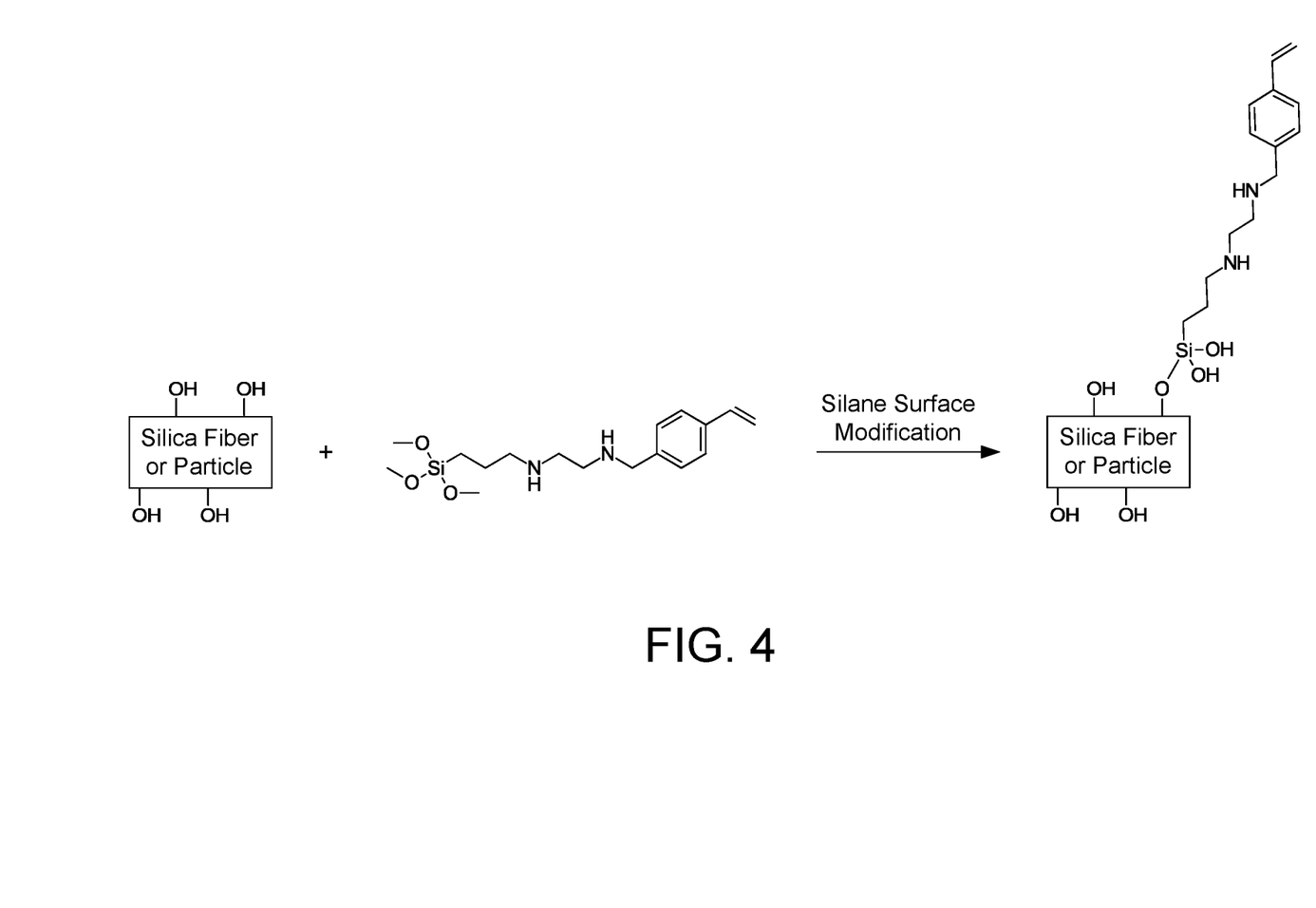
FIG. 4 is a reaction scheme illustrating a method of surface modifying a silica fiber or a silica particle to contain a latent functionality (e.g., a secondary amine) for polymer adhesion improvement, in accordance with some embodiments of the present invention.

FIG. 4 is a reaction scheme illustrating a method of surface modifying a silica fiber or a silica particle to contain a latent functionality (e.g., a secondary amine) for polymer adhesion improvement in accordance with some embodiments of the present invention. In the reaction scheme shown in FIG. 4, silica fibers or particles are surface modified via silane surface modification using a silane coupling agent having two secondary amine groups, e.g., vinylbenzylethylenediaminepropyltrimethoxysilane hydrochloride (CAS Number 171869-89-9). The resulting modified silica fibers or particles contain secondary amines as the latent functionality.

The particular silane reactant (i.e., vinylbenzylethylenediaminepropyltri-methoxysilane hydrochloride) shown in FIG. 4 is set forth for the purpose of illustration, not limitation. Those skilled in the art will appreciate that other silane coupling agents having one or more secondary amine groups may be utilized in lieu of, or in addition to, vinylbenzylethylenediaminepropyltrimethoxysilane hydrochloride. For example, trimethoxy[3-(methyl-amino)propyl]-silane (CAS Number 3069-25-8) or N-[3-(trimethoxysilyl) propyl]ethylene-diamine (CAS Number 1760-24-3) may be used in lieu of, or in addition to, vinylbenzylethylenediaminepropyltrimethoxysilane hydrochloride. Note N-[3-(trimethoxysilyl)-propyl]ethylenediamine is a silane coupling agent that has a primary amine, as well as a secondary amine.

Only one silane coupling agent reaction site is illustrated in FIG. 4 for the sake of clarity. Each silane coupling agent reaction site includes a silicon atom that attaches onto the silica fiber or particle surface, via one, two or three bonds (only one bond is shown, but three bonds are typical) each formed at an available hydroxyl group on the surface of the silica fiber or particle. While only one silane coupling agent reaction site is illustrated in FIG. 4, it is typically desirable to react a quantity of the silane sufficient to react with all of the available hydroxyl groups on the surface of the silica fiber or particle. Hence, it is typically desirable to determine the number of available hydroxyl groups on the surface of the silica fiber or particle and then, in turn, determine a quantity of silane coupling agent sufficient to react with all of those available hydroxyl groups. Generally, stoichiometric quantities of the reactants may be used in the reaction scheme shown in FIG. 4 (i.e., one silicon atom/three available hydroxyl groups). However, the relative quantity of the reactants may be adjusted in the reaction scheme shown in FIG. 4 to achieve a desired level of functionalization (e.g., 5-10 wt %).

The silica fibers or particles may be reacted with Dow Corning® Z-6032 Silane, for example, using conventional silane surface modification techniques well known to those skilled in the art. Dow Corning® Z-6032 Silane contains 1,2-ethanediamine, N-[3-(trimethoxysilyl)propyl]-,N'-[(ethylphenyl)methyl] derivatives, hydrochlorides (CAS Number 171869-89-9) (30-50%), along with methanol (50-70%) and N-[3-(trimethoxysilyl)propyl]-ethylenediamine (CAS Number 1760-24-3) (10-20%). This reaction may be performed at room temperature using conventional procedures well known to those skilled in the art. The reaction conditions may be either acidic or basic. For example, the reaction may be performed in an acid bath having a pH of approximately 4.5. Either HCl or acetic acid, for example, may be used to drop the pH to 4.5 or lower. Alternatively, the reaction may be performed in a bath having a basic pH. In this case, a pH of 7-12 is preferred, most preferred is pH=10. Either ammonium or sodium hydroxide, for example, may be used to raise the pH to 7 or higher. In either case, the reaction is typically performed in the presence of ethanol (or methanol) and water. Typically, methanol is preferred for trimethoxysilanes, while ethanol is preferred for triethoxysilanes.

The silica fiber or particle shown in FIG. 4 is set forth for the purpose of illustration, not limitation. One skilled in the art will appreciate that other filler materials may be used in lieu of, or in addition to, silica fibers or particles. For example, carbon black, $TiO_2$, ZnO and myriad other conventional filler materials may be used in lieu of, or in addition to, silica fibers or particles. Suitable filler materials contain surface hydroxyl groups that can condense with the silane (e.g., Dow Corning® Z-6032 Silane).

Figure 5:
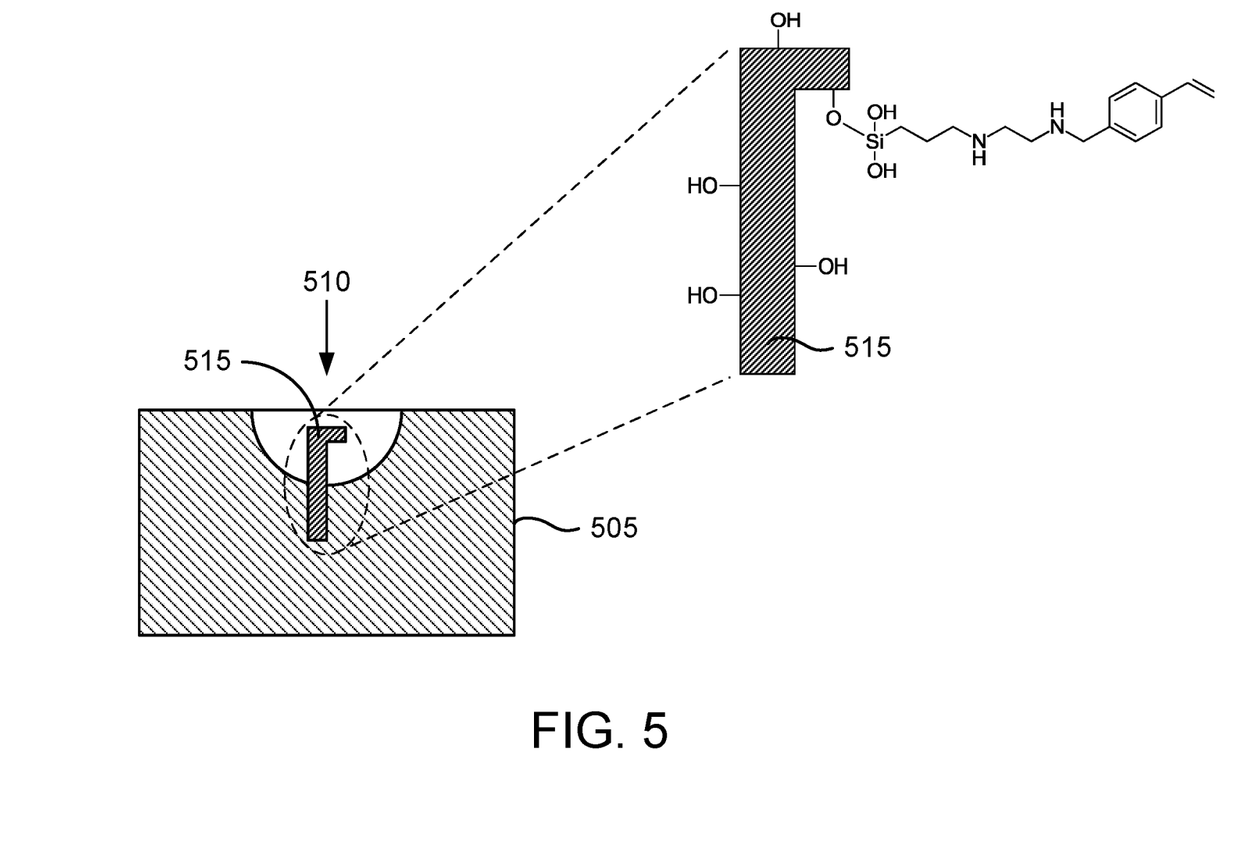
FIG. 5 is a sectional view of a portion of a cured overcoat and/or protection layer having a void created via etching or a blowing agent and in which a surface modified silica fiber is exposed for polymer adhesion improvement, in accordance with some embodiments of the present invention.

FIG. 5 is a sectional view of a portion of a cured overcoat and/or protection layer 505 having a void 510 created via etching or a blowing agent and in which a surface modified silica fiber 515 is exposed for polymer adhesion improvement, in accordance with some embodiments of the present invention. The cured layer 505 shown in FIG. 5 may correspond to the overcoat layer 120 and/or the protection layer 121 shown in FIGS. 1 and 2. As shown in FIG. 5, in an enlarged view, the modified silica fiber 515 is surface modified to contain secondary amine groups as the latent functionality. The modified silica fiber 515 may be either pre-blend modified (i.e., a silica fiber is surface modified to contain the latent functionality before the silica fiber is blended into the epoxy-based resin system composition) or post-exposure modified (i.e., a silica fiber is surface modified to contain the latent functionality after being exposed in the void 510 on the surface of the cured layer 505).

The modified silica fiber 515 may be provided, for example, using the reaction scheme shown in FIG. 4. That is, the modified silica fiber 515 may be provided via silane surface modification (in either pre-blend modified embodiments or post-exposure modified embodiments) of silica fibers using vinylbenzylethylenediaminepropyltrimethoxysilane hydrochloride (CAS Number 171869-89-9) as the silane coupling agent.

Only one silane coupling agent reaction site is illustrated in FIG. 5 for the sake of clarity. Each silane coupling agent reaction site includes a silicon atom that attaches onto the surface of silica fiber 515, via one, two or three bonds (only one bond is shown, but three bonds are typical) each formed at an available hydroxyl group on the surface of the silica fiber or particle. While only one silane coupling agent reaction site is illustrated in FIG. 5, it is typically desirable to react a quantity of the silane sufficient to react with all of the available hydroxyl groups on the surface of the silica fiber 515. Hence, it is typically desirable to determine the number of available hydroxyl groups on the surface of the silica fiber 515 and then, in turn, determine a quantity of silane coupling agent sufficient to react with all of those available hydroxyl groups. Generally, stoichiometric quantities of the reactants may be used in the reaction scheme shown in FIG. 4 (i.e., one silicon atom/three available hydroxyl groups). However, the relative quantity of the reactants may be adjusted in the reaction scheme shown in FIG. 4 to achieve a desired level of functionalization (e.g., 5-10 wt %).

Hydroxy-functionalities from ring-opening the oxirane on the epoxy-based resin (e.g. phenyl glycidyl ether) will react with the amine (i.e., the "latent amine") on the silane attached to the filler material. This latent functionality does not react at the first temperature used for the initial curing/cross-linking. Rather, this reaction will only occur in a final curing/cross-linking in response to a stimulus not used in the initial curing/cross-linking. Heat (i.e., a second temperature greater than the first temperature used for the initial curing/cross-linking) and/or UV light (i.e., in conjunction with a UV initiator) could be used for the final curing/cross-linking.

The surface modified silica fiber 515 shown in FIG. 5 is set forth for the purpose of illustration, not limitation. One skilled in the art will appreciate that other filler materials may be used in lieu of, or in addition to, surface modified silica fibers. For example, surface modified silica particles may be used in lieu of, or in addition to, surface modified silica fibers.

Figure 6:
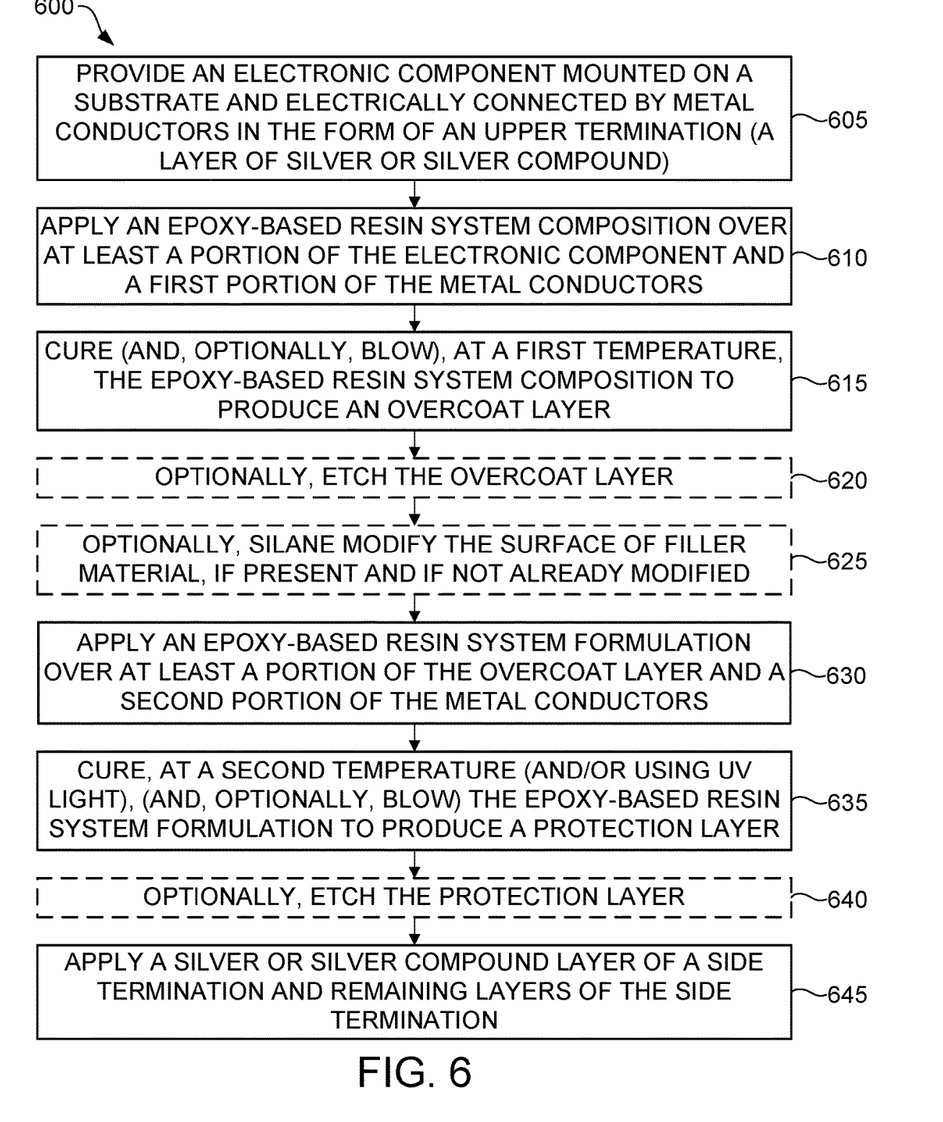
FIG. 6 is a flow chart diagram of a method of producing an anti-sulfur resistor (ASR) that utilizes an epoxy-based resin system composition containing a latent functionality for polymer adhesion improvement to better protect metal conductors, in accordance with some embodiments of the present invention.

FIG. 6 is a flow chart diagram of a method 600 of producing an anti-sulfur resistor (ASR) that utilizes an epoxy-based resin system composition containing a latent functionality for polymer adhesion improvement to better protect metal conductors, in accordance with some embodiments of the present invention. Method 600 sets forth the preferred order of steps. It must be understood, however, that the various steps (i.e., steps 605-645) may occur simultaneously or at other times relative to one another. For example, this process may occur before the resistors are mounted to a substrate. In such an example, the entire ASR may be formed first, followed by mounting the ASR to the substrate, and then conformal coating. Optional steps (i.e., steps 620, 625 and 640) are denoted in boxes with dashed lines.

Method 600 begins by providing an electronic component mounted on a substrate and electrically connected by metal conductors in the form of an upper silver termination layer (step 605). For example, referring temporarily to FIGS. 1 and 2, the electronic component may correspond to the resistor element 102 mounted on the substrate 104 and electrically connected by metal conductors in the form of the silver termination layer (upper termination) 111.

Method 600 continues by applying an epoxy-based resin system composition over at least a portion of the electronic component and a first portion of the metal conductors (step 610). For example, step 610 may correspond to applying an epoxy-based resin system composition that includes a latent functionality. The epoxy-based resin system composition may be applied using conventional deposition processes well known to those skilled in the art. In some embodiments, the epoxy-based resin system composition includes one or more epoxy-based resins, one or more hardeners and, optionally, one or more blowing agents and/or one or more filler materials. An epoxide functionality of at least one of the one or more epoxy-based resins and a reactive functionality of at least one of the one or more hardeners react with each other at a first temperature. The latent functionality, which does not react at the first temperature, is contained in at least one of the one or more epoxy-based resins, the one or more hardeners and the one or more filler materials and reacts in response to another stimulus (e.g., UV light in conjunction with a UV initiator and/or a second temperature greater than the first temperature) to enhance chemical bonding between an overcoat layer (which will be produced from this epoxy-based resin system composition) and a protection layer (which will be produced from a subsequently applied (step 630, described below) epoxy-based resin system formulation).

Then, the method 600 continues by curing (and, optionally, blowing), at a first temperature, the epoxy-based resin system composition to produce an overcoat layer (step 615). For example, referring temporarily to FIGS. 1 and 2, step 615 may correspond to curing an epoxy-based resin system composition that includes a latent functionality for polymer adhesion improvement to produce the overcoat layer 120. At the first temperature, as noted above, an epoxide functionality of at least one of the one or more epoxy-based resins and a reactive functionality of at least one of the one or more hardeners react with each other. In embodiments where the epoxy-based resin system composition includes one or more blowing agents, curing the epoxy-based resin system composition also blows (foams) the epoxy-based resin system composition creating voids (e.g., 510 in FIG. 5) on the surface of the overcoat layer.

Optionally, the cured overcoat layer may then be etched (step 620). In this optional step, the cured overcoat layer may be modified via an etching process in its entirety or locally in one or more critical areas (e.g., regions where the protection layer and the various platings of the side termination will be subsequently applied). The etching process may be mechanical and/or chemical. For example, the cured overcoat layer may be etched using a mechanical etching process such as bead blasting or polishing. Such mechanical etching processes are conventional and well known to those skilled in the art. Alternatively, the cured overcoat layer may be etched using a chemical etching process such as acid etching, alkaline etching, permanganate etching, or gas plasma etching. Such chemical etching processes are conventional and well known to those skilled in the art. The etching process creates a rough surface (e.g., voids 510 in FIG. 5) on the surface of the cured overcoat layer.

Optionally, in embodiments where the epoxy-based resin system composition includes one or more filler materials that are neat (i.e., not pre-blend modified), the filler material exposed on the etched/blown epoxy surface of the cured overcoat layer is silane modified (step 625). In this optional step, the filler material exposed on the etched/blown epoxy surface of the cured overcoat layer may be, for example, exposed silica fibers (e.g., 515 in FIG. 5). These exposed silica fibers 515 may be silane modified, for example, using the reaction scheme shown in FIG. 4. That is, the exposed silica fibers may be post-exposure modified using vinylbenzylethylenediaminepropyltrimethoxysilane hydrochloride (CAS Number 171869-89-9) as the silane coupling agent.

For example, the exposed silica fibers may be reacted with Dow Corning® Z-6032 Silane, for example, using conventional silane surface modification techniques well known to those skilled in the art. Dow Corning® Z-6032 Silane contains 1,2-ethanediamine, N-[3-(trimethoxysilyl)propyl]-, N'-[(ethylphenyl)methyl] derivatives, hydrochlorides (CAS Number 171869-89-9) (30-50%), along with methanol (50-70%) and N-[3-(trimethoxysilyl)propyl] ethylenediamine (CAS Number 1760-24-3) (10-20%). This reaction may be performed at room temperature using conventional procedures well known to those skilled in the art. The reaction conditions may be either acidic or basic. For example, the reaction may be performed in an acid bath having a pH of approximately 4.5. Either HCl or acetic acid, for example, may be used to drop the pH to 4.5 or lower. Alternatively, the reaction may be performed in a bath having a basic pH. In this case, a pH of 7-12 is preferred, most preferred is pH=10. Either ammonium or sodium hydroxide, for example, may be used to raise the pH to 7 or higher. In either case, the reaction is typically performed in the presence of ethanol (or methanol) and water. Typically, methanol is preferred for trimethoxysilanes, while ethanol is preferred for triethoxysilanes.

Method 600 then continues by applying an epoxy-based resin system formulation over at least a portion of the overcoat layer and a second portion of the metal conductors (step 630). For example, step 630 may correspond to applying an epoxy-based resin system formulation that includes a latent functionality. The epoxy-based resin system formulation may be applied using conventional deposition processes well known to those skilled in the art. In some embodiments, the epoxy-based resin system composition includes one or more epoxy-based resins, one or more hardeners and, optionally, one or more blowing agents and/or one or more filler materials. An epoxide functionality of at least one of the one or more epoxy-based resins and a reactive functionality of at least one of the one or more hardeners may react with each other at a first temperature. In some embodiments, it may be desirable to initially cure the epoxy-based resin system formulation at the first temperature. The latent functionality, which does not react at the first temperature, is contained in at least one of the one or more epoxy-based resins, the one or more hardeners and the one or more filler materials and reacts in response to another stimulus (e.g., UV light in conjunction with a UV initiator and/or a second temperature greater than the first temperature) to enhance chemical bonding between the overcoat layer and a protection layer (which will be produced from this epoxy-based resin system formulation).

Then, the method 600 continues by curing (and, optionally, blowing), at a second temperature (and/or using UV light in conjunction with a UV initiator), the epoxy-based resin system composition to produce a protection layer (step 635). For example, referring temporarily to FIGS. 1 and 2, step 635 may correspond to curing an epoxy-based resin system formulation that includes a latent functionality for polymer adhesion improvement to produce the protection layer 121. At the second temperature (and/or in response to UV light in conjunction with a UV initiator), as noted above, the latent functionality reacts to enhance the chemical bonding between the overcoat layer and the protection layer. In embodiments where the epoxy-based resin system formulation includes one or more blowing agents, curing the epoxy-based resin system formulation also blows (foams) the epoxy-based resin system formulation creating voids (e.g., 510 in FIG. 5) on the surface of the protection layer.

Optionally, the cured protection layer may then be etched (step 640). In this optional step, the cured protection layer may be modified via an etching process in its entirety or locally in one or more critical areas (e.g., regions where the various platings of the side termination will be subsequently applied). The etching process may be mechanical and/or chemical. For example, the cured protection layer may be etched using a mechanical etching process such as bead blasting or polishing. Such mechanical etching processes are conventional and well known to those skilled in the art. Alternatively, the cured protection layer may be etched using a chemical etching process such as acid etching, alkaline etching, permanganate etching, or gas plasma etching. Such chemical etching processes are conventional and well known to those skilled in the art. The etching process creates a rough surface (e.g., voids 510 in FIG. 5) on the surface of the cured protection layer.

Method 600 then continues by applying a silver layer of the side termination structures over at least a portion of the protection layer, and subsequently applying the remaining layers of the side termination structures (step 645). For example, referring temporarily to FIGS. 1 and 2, step 645 may correspond to applying the silver (Ag) or Ag compound layer 112 over a first portion of the protection layer 121, and subsequently applying the nickel (Ni) or Ni compound layer 114 over the Ag or Ag compound layer, a second portion of the protection layer 121 and a portion of the overcoat layer 120, and finally applying the Tin (Sn) or Sn compound layer 116 (solder) over the Sn or Sn compound layer 114 and a portion of the overcoat layer 120. These layers may be applied using conventional deposition processes (e.g., a conventional electroless plating bath and/or a conventional electrolytic deposition process) well known to those skilled in the art.

In addition, a conformal coating (e.g., 130 in FIGS. 2 and 3) may be applied over the resulting peel-resistant ASR.

EXAMPLES (PROPHETIC)

Example 1

The following ingredients may be used at the specified quantities to make an epoxy-based resin system composition/formulation:

Phenyl glycidyl ether [epoxy-based resin]: 3.00 g
Amino-ethylpiperazine [hardener] ($k_{rel}$=65.3): 0.50 g
N,N'-Diethyl-1,2-ethanediamine [hardener containing latent functionality] ($k_{rel}$=20.3): 0.50 g The following is an illustrative calculation of the stoichiometric amount of amine hardener to use to make the epoxy-based resin system composition/formulation used in Example 1. This calculation is based on methodology well known to those skilled in the art. The epoxy equivalent weight (sometimes referred to as "EEW" or "Epoxide eq wt of resin") for phenyl glycidyl ether is 151. In general, Amine H eq wt=MW of amine/number of active hydrogen. Amino-ethylpiperazine has 3 active Hs, so Amine H eq wt=129.2/3=43. In general, parts per hundred (phr) of amine=(Amine H eq wt×100)/Epoxide eq wt of resin. Then the phr (parts per hundred resin) amine becomes: (43*100)/151=28.5. Similarly, for the latent amine, there are 2 active Hs, so the latent amine H eq wt=116.2/2=58.1. For the latent amine, the phr amine is (58.1*100)/151=38.5. So for every 100 parts (this could be in grams) of epoxy, we would add 28.5 parts of amino-ethylpiperazine or 38.5 parts of the diamine for stoichiometric cure. Since we want to have residual epoxy functionality to react with the latent amine, we would limit the phr of amino-ethylpiperazine. For simplicity sake, we could add 14.25 g of amino-ethylpiperazine to 100 g of phenyl glycidyl ether and have 50% of the epoxy functionality remaining which we would then react with 19.25 g of the diamine latent hardener.

The procedure for preparation of the epoxy-based resin system composition (for producing an overcoat layer for an ASR) is as follows: The phenyl glycidyl ether is weighed out in a mixing container at room temperature. The amino-ethylpiperazine is weighed out in the mixing container at room temperature. The N,N'-diethyl-1,2-ethanediamine is weighed out in the mixing container at room temperature. The contents of the mixing container are then mixed thoroughly with a spatula for about 2 minutes. After mixing, a sufficient amount of the epoxy-based resin system composition is deposited on a portion of the resistor element and a first portion of the Ag layer of the upper termination of the ASR. The epoxy-based resin system composition is placed into a 50° C. oven to cure (initial cure/cross-linking) for 8 hours to produce the initially cured overcoat layer.

Next, the procedure for preparation of the epoxy-based resin system formulation (for producing a protection layer of an ASR) is as follows: The phenyl glycidyl ether is weighed out in a mixing container at room temperature. The amino-ethylpiperazine is weighed out in the mixing container at room temperature. The N,N'-Diethyl-1,2-ethanediamine is weighed out in the mixing container at room temperature. The contents of the mixing container are then mixed thoroughly with a spatula for about 2 minutes. After mixing, a sufficient amount of the epoxy-based resin system formulation is deposited on a second portion of the Ag layer of the upper termination of the ASR and a portion of the initially cured overcoat layer. The epoxy-based resin system formulation is placed into a 50° C. oven to cure (initial cure/cross-linking) for 8 hours to produce the initially cured protection layer. The initially cured overcoat layer and the initially cured protection layer are then placed into a 100° C. oven to cure (final cure/cross-linking) for 4 hours to produce the finally cured overcoat layer/protection layer.

Example 2

The following ingredients may be used at the specified quantities to make an epoxy-based resin system composition/formulation:

N,N-Diglycidyl-4-glycidyloxyaniline [epoxy-based resin]: 2.50 g
Diglycidyl 1,2-cyclohexanedicarboxylate [epoxy-based resin containing latent functionality]: 0.50 g
Methyltetrahydrophthalic anhydride (MTHPA) [hardener]: 1.00 g The following is an illustrative calculation of the stoichiometric amount of amine hardener to use to make the epoxy-based resin system composition/formulation used in Example 2. This calculation is based methodology that is well known to those skilled in the art. The epoxy equivalent weight (sometimes referred to as "EEW" or "Epoxide eq wt of resin") for both epoxies are roughly 105 g/eq for glycidyloxyaniline and 165 g/eq (from the center of the range) for the latent epoxy. The formula weight for the anhydride is 166.2 g/mole (or g/eq as this is a monofunctional anhydride). Consequently, we have to determine ratios based on equivalents. So, for 105 parts of the glycidyl epoxy, we have 1 eq and need 1 eq (166.2 g) of the anhydride to cure it stoichiometrically. Since we want to have latent epoxy functionality, we would use less glycidyl epoxy (52.5 parts or grams would leave 50% of the anhydride available to cure the cycloaliphatic epoxy). In this example, we would have 83.1 grams of residual anhydride left to react with the latent epoxy. Based on equivalents, we have 0.5 eqs of anhydride left to react with the latent epoxy. To cure it stoichiometrically, we then need 0.5 eqs of latent epoxy or (0.5 eq*165 g/eq)=82.5 g of latent epoxy.

The procedure for preparation of the epoxy-based resin system composition (for producing an overcoat layer for an ASR) is as follows: The N,N-diglycidyl-4-glycidyloxyaniline is weighed out in a mixing container at room temperature. The diglycidyl 1,2-cyclohexanedicarboxylate is weighed out in the mixing container at room temperature. The contents of the mixing container are then mixed thoroughly with a spatula for about 2 minutes. The methyltetrahydrophthalic anhydride is weighed out in the mixing container at room temperature. The contents of the mixing container are then mixed thoroughly with a spatula for about 2 minutes. After mixing, a sufficient amount of the epoxy-based resin system composition is deposited on a portion of the resistor element and a first portion of the Ag layer of the upper termination of the ASR. The epoxy-based resin system composition is placed into a 130° C. oven to cure (initial cure/cross-linking) for 2 hours to produce the initially cured overcoat layer.

Next, the procedure for preparation of the epoxy-based resin system formulation (for producing a protection layer of an ASR) is as follows: The N,N-diglycidyl-4-glycidyloxyaniline is weighed out in a mixing container at room temperature. The diglycidyl 1,2-cyclohexanedicarboxylate is weighed out in the mixing container at room temperature. The contents of the mixing container are then mixed thoroughly with a spatula for about 2 minutes. The methyltetrahydrophthalic anhydride is weighed out in the mixing container at room temperature. The contents of the mixing container are then mixed thoroughly with a spatula for about 2 minutes. After mixing, a sufficient amount of the epoxy-based resin system formulation is deposited on a second portion of the Ag layer of the upper termination of the ASR and a portion of the initially cured overcoat layer. The epoxy-based resin system formulation is placed into a 130° C. oven to cure (initial cure/cross-linking) for 2 hours to produce the initially cured protection layer. The initially cured overcoat layer and the initially cured protection layer are then placed into a 180° C. oven to cure (final cure/cross-linking) for 1.5 hours to produce the finally cured overcoat layer/protection layer.

Example 3

The following ingredients may be used at the specified quantities to make an epoxy-based resin system composition/formulation:
  N,N-Diglycidyl-4-glycidyloxyaniline [epoxy-based resin]: 3.00 g
  Methyltetrahydrophthalic anhydride (MTHPA) [hardener]: 1.00 g
  Modified silica fibers [filler material containing latent functionality]: 0.150 g The following is an illustrative calculation of the stoichiometric amount of amine hardener to use to make the epoxy-based resin system composition/formulation used in Example 3. This calculation is based on methodology well known to those skilled in the art. The epoxy equivalent weight (sometimes referred to as "EEW" or "Epoxide eq wt of resin") for the glycidyl epoxy is roughly 105 g/eq. The formula weight for the anhydride is 166.2 g/mole (or g/eq as this is a monofunctional anhydride). Consequently, we have to determine ratios based on equivalents. So, for 105 parts of the glycidyl epoxy, we have 1 eq and need 1 eq (166.2 g) of the anhydride to cure it stoichiometrically. So, in this illustrative calculation, we have 105 parts of epoxy, 166 parts anhydride, and 5.25 parts fibers.

Initially, the procedure for preparation of the modified silica fibers is as follows: Silica fibers are reacted with Dow Corning® Z-6032 Silane using the conventional procedures described above with reference to FIG. 4.

The procedure for preparation of the epoxy-based resin system composition (for producing an overcoat layer for an ASR) is as follows: The N,N-diglycidyl-4-glycidyloxyaniline is weighed out in a mixing container at room temperature. The modified silica fibers are weighed out in the mixing container at room temperature. The contents of the mixing container are then mixed thoroughly with a spatula for about 2 minutes. The methyltetrahydrophthalic anhydride is weighed out in the mixing container at room temperature. The contents of the mixing container are then mixed thoroughly with a spatula for about 2 minutes. After mixing, a sufficient amount of the epoxy-based resin system composition is deposited on a portion of the resistor element and a first portion of the Ag layer of the upper termination of the ASR. The epoxy-based resin system composition is placed into a 130° C. oven to cure (initial cure/cross-linking) for 2 hours to produce the initially cured overcoat layer.

The initially cured overcoat layer is then etched to expose the modified silica fibers. This may be accomplished using a mechanical etching process (e.g., bead blasting or polishing) or a chemical etching process (e.g., acid etching, alkaline etching, permanganate etching, or gas plasma etching).

Next, the procedure for preparation of the epoxy-based resin system formulation (for producing a protection layer of an ASR) is as follows: The N,N-diglycidyl-4-glycidyloxyaniline is weighed out in a mixing container at room temperature. The modified silica fibers are weighed out in the mixing container at room temperature. The contents of the mixing container are then mixed thoroughly with a spatula for about 2 minutes. The methyltetrahydrophthalic anhydride is weighed out in the mixing container at room temperature. The contents of the mixing container are then mixed thoroughly with a spatula for about 2 minutes. After mixing, a sufficient amount of the epoxy-based resin system formulation is deposited on a second portion of the Ag layer of the upper termination of the ASR and a portion of the initially cured/etched overcoat layer. The epoxy-based resin system formulation is placed into a 130° C. oven to cure (initial cure/cross-linking) for 2 hours to produce the initially cured protection layer. The initially cured overcoat layer and the initially cured protection layer are then placed into a 180° C. oven to cure (final cure/cross-linking) for 1.5 hours to produce the finally cured overcoat layer/protection layer.

Example 4

The following ingredients may be used at the specified quantities to make an epoxy-based resin system composition/formulation:
  N,N-Diglycidyl-4-glycidyloxyaniline [epoxy-based resin]: 3.00 g
  Methyltetrahydrophthalic anhydride (MTHPA) [hardener]: 1.00 g
  Modified silica fibers [filler material containing latent functionality]: 0.15 g
  CELOGEN OT blowing agent (CelChem LLC): 0.25 g
  DC-193 surfactant (Air Products & Chemical Corporation): 0.10 g The following is an illustrative calculation of the stoichiometric amount of amine hardener to use to make the epoxy-based resin system composition/formulation used in Example 4. This calculation is based on methodology well known to those skilled in the art. The epoxy equivalent weight (sometimes referred to as "EEW" or "Epoxide eq wt of resin") for the glycidyl epoxy is roughly 105 g/eq. The formula weight for the anhydride is 166.2 g/mole (or g/eq as this is a monofunctional anhydride). Consequently, we have to determine ratios based on equivalents. So, for 105 parts of the glycidyl epoxy, we have 1 eq and need 1 eq (166.2 g) of the anhydride to cure it stoichiometrically. So, in this illustrative calculation, we have 105 parts of epoxy, 166 parts anhydride, 5.25 parts fibers, 8.75 parts blowing agent, and 3.5 parts surfactant.

Initially, the procedure for preparation of the modified silica fibers is as follows: Silica fibers are reacted with Dow Corning® Z-6032 Silane using the conventional procedures described above with reference to FIG. 4.

The procedure for preparation of the epoxy-based resin system composition (for producing an overcoat layer for an ASR) is as follows: The N,N-diglycidyl-4-glycidyloxyaniline is weighed out in a mixing container at room temperature. The DC-193 surfactant is weighed out in the mixing container at room temperature. The modified silica fibers are weighed out in the mixing container at room temperature. The contents of the mixing container are then mixed thoroughly with a spatula for about 2 minutes. The CELOGEN OT blowing agent is added to the contents of the mixing container and stirred together. The methyltetrahydrophthalic anhydride is weighed out in the mixing container at room temperature. The contents of the mixing container are then mixed thoroughly with a spatula for about 2 minutes. After mixing, a sufficient amount of the epoxy-based resin system composition is deposited on a portion of the resistor element and a first portion of the Ag layer of the upper termination of the ASR. The epoxy-based resin system composition is placed into a 130° C. oven to cure (initial cure/cross-linking) and foam/blow for 2 hours to produce the initially cured/blown overcoat layer. The modified silica particles are exposed in the voids on the surface of the blown (foamed) epoxy.

Next, the procedure for preparation of the epoxy-based resin system formulation (for producing a protection layer of an ASR) is as follows: The N,N-diglycidyl-4-glycidyloxyaniline is weighed out in a mixing container at room temperature. The DC-193 surfactant is weighed out in the mixing container at room temperature. The modified silica fibers are weighed out in the mixing container at room temperature. The contents of the mixing container are then mixed thoroughly with a spatula for about 2 minutes. The CELOGEN OT blowing agent is added to the contents of the mixing container and stirred together. The methyltetrahydrophthalic anhydride is weighed out in the mixing container at room temperature. The contents of the mixing container are then mixed thoroughly with a spatula for about 2 minutes. After mixing, a sufficient amount of the epoxy-based resin system formulation is weigh out and deposited on a second portion of the Ag layer of the upper termination of the ASR and a portion of the initially cured/blown overcoat layer. The epoxy-based resin system formulation is placed into a 130° C. oven to cure (initial cure/cross-linking) and foam/blow for 2 hours to produce the initially cured/blown protection layer. The initially cured/blown overcoat layer and the initially cured/blown protection layer are then placed into a 180° C. oven to cure (final cure/cross-linking) for 1.5 hours to produce the finally cured overcoat layer/protection layer.

The above-listed exemplary epoxy-based resins, hardeners, filler materials, blowing agents, surfactants and concentrations are set forth for the purpose of illustration, not limitation. Those skilled in the art will appreciate that other resins, hardeners, filler materials, blowing agents, surfactants, curing conditions, and/or concentrations may be used within the scope of the present invention.

One skilled in the art will appreciate that many variations are possible within the scope of the present invention. Thus, while the present invention has been particularly shown and described with reference to some embodiments thereof, it will be understood by those skilled in the art that these and other changes in form and detail may be made therein without departing from the spirit and scope of the present invention.

What is claimed is:

1. A method for producing an apparatus, comprising:
   providing an electronic component mounted on a substrate and electrically connected by metal conductors, wherein the metal conductors each have an upper termination layer with an upper surface; and
   covering at least a portion of the electronic component with an overcoat layer, wherein the overcoat layer overlies a first portion of the upper surface of the upper termination layer of the metal conductors and comprises an epoxy-based resin system;
   covering at least a portion of the overcoat layer with a protection layer, wherein the protection layer overlies a second portion of the upper surface of the upper termination layer of the metal conductors and comprises an epoxy-based resin system, wherein the overcoat layer and the protection layer together cover all of the upper surface of the upper termination layer of the metal conductors;
   wherein at least one of the overcoat layer and the protection layer is an epoxy-based resin system composition comprising:
   one or more epoxy-based resins, wherein at least one of the one or more epoxy-based resins includes a first epoxide functionality;
   one or more hardeners, wherein at least one of the one or more hardeners includes a first reactive functionality, and wherein the first reactive functionality and the first epoxide functionality react with each other at a first temperature;
   zero, one or more filler materials;
   wherein a latent functionality is contained in at least one of the one or more epoxy-based resins, the one or more hardeners, and the zero, one or more filler materials, wherein the latent functionality does not react at the first temperature, and wherein the latent functionality reacts in response to a stimulus comprising at least one of ultraviolet (UV) light and a second temperature greater than the first temperature.

2. The method as recited in claim 1, wherein the overcoat layer is the epoxy-based resin system composition, and wherein covering at least a portion of the electronic component with an overcoat layer comprises:
   applying the epoxy-based resin system composition in an at least partially uncured state over the electronic component, the metal conductors, and the substrate by dipping, spraying, spin-coating, casting, brushing, rolling, and/or syringe; and
   curing, at the first temperature, the epoxy-based resin system composition applied over the electronic component, metal conductors, and the substrate to thereby produce the overcoat layer.

3. The method as recited in claim 2, wherein the protection layer is an epoxy-based resin system formulation, and wherein covering at least a portion of the overcoat layer with a protection layer comprises:
   applying the epoxy-based resin system formulation in an at least partially uncured state over the overcoat layer, the metal conductors, and the substrate by dipping, spraying, spin-coating, casting, brushing, rolling, and/or syringe; and
   curing, via the stimulus, the epoxy-based resin system formulation applied over the overcoat layer, metal conductors, and the substrate to thereby produce the protection layer.

4. The method as recited in claim 3, further comprising:
   etching at least a portion of a surface of the overcoat layer to roughen the surface of the overcoat layer before applying the epoxy-based resin system formulation over the overcoat layer.

5. The method as recited in claim 4, wherein etching the overcoat layer includes exposing at least one of the zero, one or more filler materials on the surface of the overcoat layer.

6. The method as recited in claim 5, wherein the at least one of the zero, one or more filler materials includes at least one of silica fibers and silica particles surface modified to contain the latent functionality.

7. The method as recited in claim 5, wherein the at least one of the zero, one or more filler materials includes at least one of silica fibers and silica particles, the method further comprising:
   modifying a surface of the at least one of the zero, one or more filler materials to contain the latent functionality after etching the overcoat layer but before applying the epoxy-based resin system formulation over the overcoat layer.

8. The method as recited in claim 3, wherein the epoxy-based resin system composition further comprises a blowing agent, the method further comprising:
activating the blowing agent to form voids on the surface of the overcoat layer before applying the epoxy-based resin system formulation in the at least partially uncured state over the overcoat layer.

9. The method as recited in claim 8, wherein activating the blowing agent to form voids on the surface of the overcoat layer includes exposing at least one of the zero, one or more filler materials on the surface of the overcoat layer.

10. The method as recited in claim 9, wherein the at least one of the zero, one or more filler materials includes at least one of silica fibers and silica particles surface modified to contain the latent functionality.

11. The method as recited in claim 9, wherein the at least one of the zero, one or more filler materials includes at least one of silica fibers and silica particles, the method further comprising:
modifying a surface of the at least one of the zero, one or more filler materials to contain the latent functionality after activating the blowing agent to form voids on the surface of the overcoat layer but before applying the epoxy-based resin system formulation over the overcoat layer.

12. The method as recited in claim 1, wherein at least one of the one or more hardeners contains the latent functionality, wherein the first reactive functionality of the at least one of the one or more hardeners that includes the first reactive functionality is a primary amine, and wherein the latent functionality of the at least one of the one or more hardeners that contains the latent functionality is a secondary amine.

13. The method as recited in claim 1, wherein the at least one of the one or more hardeners that includes the first reactive functionality also contains the latent functionality, wherein the first reactive functionality of the least one of the one or more hardeners is a primary amine, and wherein the latent functionality of the at least one of the one or more hardeners is a secondary amine.

14. The method as recited in claim 1, wherein at least one of the one or more epoxy-based resins contains the latent functionality, wherein the at least one of the one or more epoxy-based resins that contains the latent functionality is a cycloaliphatic epoxy resin, and wherein the at least one of the one or more epoxy-based resins that includes the first epoxide functionality is selected from a group consisting of bisphenol A epoxy resin, bisphenol F epoxy resin, novalac epoxy resin, aliphatic epoxy resin, glycidylamine epoxy resin, phenyl glycidyl ether, and combinations thereof.

15. The method as recited in claim 1, wherein the one or more hardeners includes an onium salt as a UV initiator.

16. An apparatus, comprising:
a substrate;
an electronic component mounted on the substrate;
metal conductors electrically connecting the electronic component, wherein the metal conductors each have an upper termination layer with an upper surface; and
an overcoat layer covering at least a portion of the electronic component, wherein the overcoat layer overlies a first portion of the upper surface of the upper termination layer of the metal conductors and comprises a cured epoxy resin;
a protection layer covering at least a portion of the overcoat layer, wherein the protection layer overlies a second portion of the upper surface of the upper termination layer of the metal conductors and comprises a cured epoxy resin, wherein the overcoat layer and the protection layer together cover all of the upper surface of the upper termination layer of the metal conductors;
wherein at least one of the overcoat layer and the protection layer is formed from an epoxy-based resin system composition comprising:
one or more epoxy-based resins, wherein at least one of the one or more epoxy-based resins includes a first epoxide functionality;
one or more hardeners, wherein at least one of the one or more hardeners includes a first reactive functionality, and wherein the first reactive functionality and the first epoxide functionality react with each other at a first temperature;
zero, one or more filler materials;
wherein a latent functionality is contained in at least one of the one or more epoxy-based resins, the one or more hardeners, and the zero, one or more filler materials, wherein the latent functionality does not react at the first temperature, and wherein the latent functionality reacts in response to a stimulus comprising at least one of ultraviolet (UV) light and a second temperature greater than the first temperature.

17. The apparatus as recited in claim 16, wherein the overcoat layer and the protection layer are exposed to, and protect the metal conductors from, a gaseous environment that includes elemental sulfur, hydrogen sulfide, and/or sulfur oxides, and wherein the metal conductors comprise silver.

18. The apparatus as recited in claim 17, wherein the electronic component is an anti-sulfur resistor (ASR) of a resistor network array, and wherein the metal conductors comprise an upper termination of the ASR.

* * * * *